March 1, 1960 R. B. LEWIS 2,926,452
APPARATUS FOR AVOIDING ENTANGLEMENT OF FISHING
EQUIPMENT WITH MARINE PLANTS
Filed Dec. 6, 1955 3 Sheets-Sheet 1

INVENTOR.
ROBERT B. LEWIS
BY
Robert A. Dunham
ATTORNEY

March 1, 1960   R. B. LEWIS   2,926,452
APPARATUS FOR AVOIDING ENTANGLEMENT OF FISHING EQUIPMENT WITH MARINE PLANTS
Filed Dec. 6, 1955   3 Sheets-Sheet 2
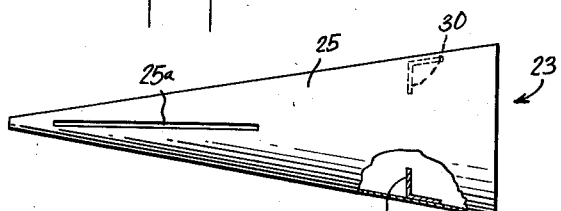
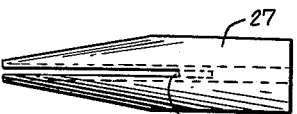
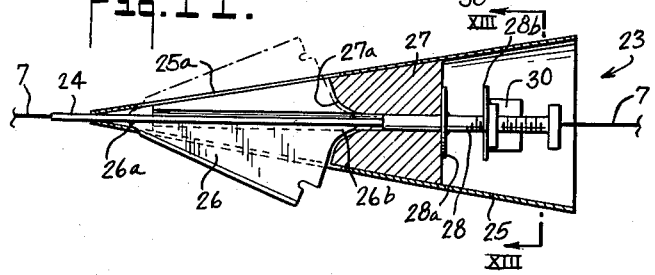
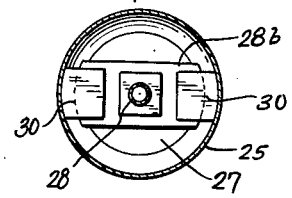
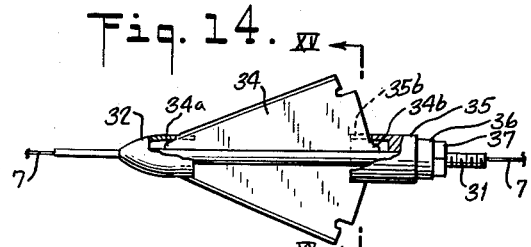
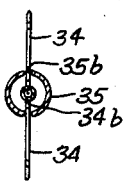
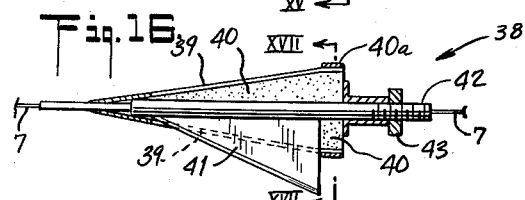
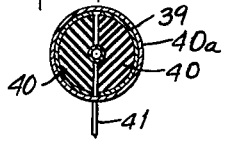
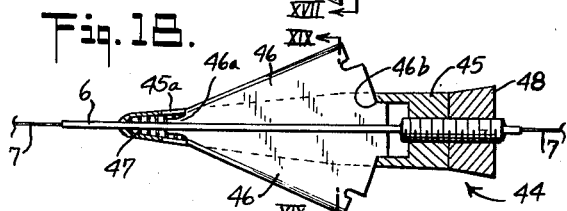
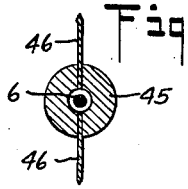
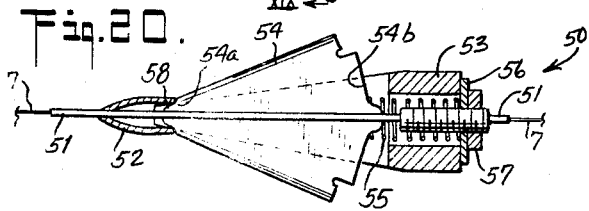
INVENTOR.
ROBERT B. LEWIS
BY
Robert A. Dunham
ATTORNEY

United States Patent Office 2,926,452
Patented Mar. 1, 1960

2,926,452

APPARATUS FOR AVOIDING ENTANGLEMENT OF FISHING EQUIPMENT WITH MARINE PLANTS

Robert B. Lewis, Sussex, N.J.

Application December 6, 1955, Serial No. 551,249

15 Claims. (Cl. 43—43.1)

This invention relates to apparatus for attachment to a fishing line to protect a lure or other equipment on said line from entanglement with marine plants.

Fishermen are often troubled with either floating or rooted weeds and other marine plants entangling their lures and other parts of their fishing equipment. Perhaps the most troublesome plants in this respect are weeds floating freely. Such floating weeds have a tendency to cling to a passing fishing line and to slide along it until they engage a projection, such as the swivel that connects the line to the leader, where they pile up. Some of the weeds may slide past the swivel and pile up on the lure, a sinker or any other piece of equipment which may be attached to the line. Sometimes the entanglement results in breakage of the line with loss of part of the equipment. Various attempts have been made to solve this problem by constructing lures and hooks with guards intended to prevent entanglement with the weeds. However, such guards are not always completely effective. Furthermore, the guards decrease the efficiency of the hooks and make it easier for a fish to avoid capture.

An object of the present invention is to provide a weed cutter adapted to be attached to a fishing line ahead of the lure or hook so that as the line passes through the weeds, the weeds directly in the path of the lure or hook are cut away.

Another object is to provide a weed cutter of the type described including a mounting for the blades which automatically releases the blades upon entanglement thereof with an unyielding object, such as a rock.

Another object is to provide improved means for attaching such a weed cutter or other equipment to a fishing line and having no projections which might be snagged by marine plants.

The foregoing objects of the invention are attained, in most of the embodiments described herein, by providing a conduit or tube through which a portion of the fishing line or leader may pass. Attached to the outside of the tube is a blade supporting structure. In the presently preferred embodiments, the blades are flat and are clamped to the support either by their flat sides or are held by hooks formed in their ends. This cutter assembly may be provided with a float to make the cutter sufficiently buoyant so that it does not tend to sink but instead moves through the water ahead of the lure. The lure may be attached to the line or leader behind the weed cutter, the attachment being made by conventional means, such as a swivel. A swivel may also be used to connect the leader at the front end of the cutter to the line leading to the fishing rod. If a swivel is so used, a guard having a tapered nose is placed around it to protect it from entanglement with weeds and to push the weeds aside so that they slide along the passing line until they are engaged by the cutter.

Various types of cutter blade structures are shown and described, the preferred type comprising two thin flat blades which may be sections of a diagonally split razor blade. Various clamping and supporting arrangements are shown for the blades, the presently preferred type having a spring release which allows the blade to pull out of the support if it engages an unyielding object such as a rock.

Other objects and advantages of the invention will become apparent from a consideration of the following description and claims, taken together with the accompanying drawing.

In the drawing:

Fig. 10 is an elevational view of a shell used in another embodiment of the invention;

Fig. 11 is a sectional view of a complete weed cutter using the shell of Fig. 10, with certain parts removed;

Fig. 12 is an elevational view of one of the parts of the cutter of Fig. 11;

Fig. 13 is a cross-sectional view taken on the line XIII—XIII of Fig. 11;

Fig. 14 is a view, partly in plan and partly in section, of another embodiment of the invention;

Fig. 15 is a sectional view taken on the line XV—XV of Fig. 14;

Fig. 16 is a horizontal cross-sectional view of another embodiment of the invention, with certain parts omitted;

Fig. 17 is a cross-sectional view on the line XVII—XVII of Fig. 16;

Fig. 18 is a horizontal cross-sectional view of another embodiment of the invention;

Fig. 19 is a cross-sectional view taken on the line XIX—XIX of Fig. 18;

Fig. 20 is a horizontal cross-sectional view of another embodiment of the invention;

Figure 1:
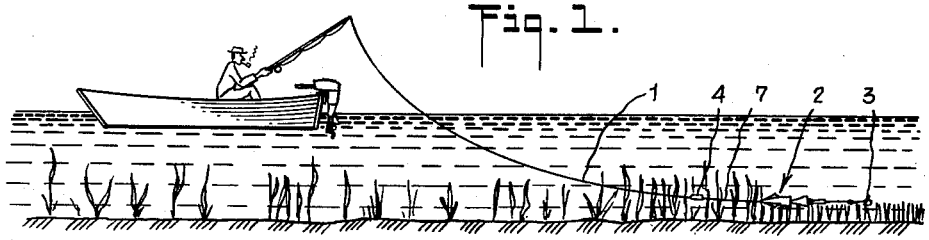
Fig. 1 is a sectional view showing apparatus constructed according to the invention in use by a fisherman, the dimensions of the weed cutter and associated parts being exaggered.

Referring to the drawings, there is shown in Fig. 1 a fisherman using a fishing line 1 to which is attached a weed cutter generally indicated at 2 and a lure 3. The connection between the weed cutter 2 and the line 1 is made by a leader 7 and a swivel 5 protected by a guard 4.

*Figs. 2 to 5*

Figure 2:
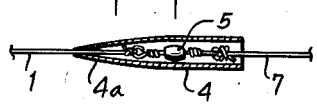
Fig. 2 is a sectional view showing a swivel guard comprising a feature of the invention.
Figure 3:
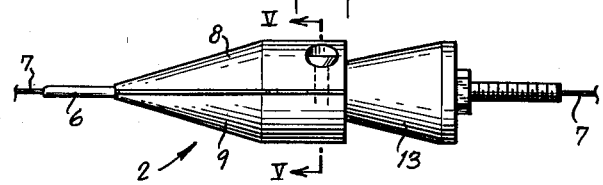
Fig. 3 is an elevational view of one form of weed cutter constructed in accordance with the invention.
Figure 5:
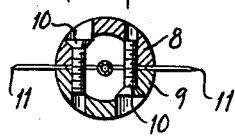
Fig. 5 is a sectional view taken along the line V—V of Fig. 3.
Figure 4:
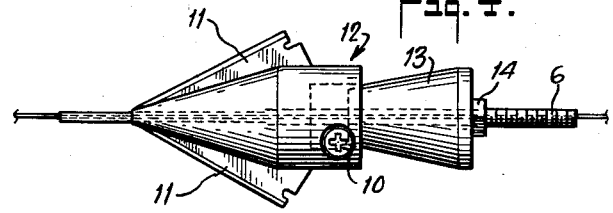
Fig. 4 is a plan view of the weed cutter of Fig. 3.

Fig. 2 shows the details of construction of the swivel 5 and guard 4; and Figs. 3 to 5 illustrate the weed cutter 2 of Fig. 1 in detail.

As shown in Fig. 2, the swivel guard 4 comprises a tube which encircles the swivel 5. The tube is generally cylindrical and tapers conically at its leading end, as shown at 4a. The tube is hollow, and the central opening of the tube at its leading end has an inner diameter just sufficient for passage of the fishing line 1 with slight clearance. The walls of the tube at the leading end 4a are thin and sharp-edged to provide as little projection as possible, since such a projection might snag or engage a weed or plant past which the line 1 is moving. The weeds or plants are guided outwardly away from the line by the portion 4a of the swivel guard and, as the line moves past them, are next engaged by the weed cutter 2.

Figure 6:
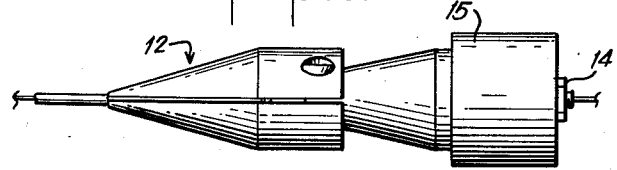
Fig. 6 is a view similar to Fig. 3, showing a float or buoyant member attached to the weed cutter.

Weed cutter 2 comprises a central tube or conduit 6. The leader 7, is attached to the back end of the swivel 5, and passes through the tube 6, extending out the back end of the tube where it may be attached to the lure 3 by conventional means, for example, another swivel. On the outside of the tube 6 there are clamped two halves 8 and 9 of a supporting structure hereinafter termed a shell and comprising a forward, outwardly conical portion and a rearwardly extending cylindrical portion. The two halves 8 and 9 of the shell are held firmly together by a pair of screws 10 which extend through transverse threaded passages provided in the back portion of the shell. The shell halves 8 and 9 clamp between them a pair of blades 11. The blades 11 are illustrated as being diagonally split halves of a common safety razor blade, and it is preferred to use the blades of that construction. The blades 11 may be readily removed and replaced by simply loosening the screws 10. The back end of the shell 12 is closed by means of a plug 13, the whole assembly being held in place on the tube 6 by means of a nut 14 which threadedly engages an externally threaded part of the tube 6. If the weed cutter 2 as shown in Figs. 3 to 5 is not sufficiently light, a float 15 may be added on the back part of the tube 6 behind the plug 13, as shown in Fig. 6. Alternatively, the shell 12 itself and/or the plug 13 may serve as a float, either by virtue of being made hollow and water tight, or by being made of buoyant material.

Figure 8:
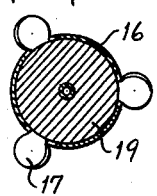
Fig. 8 is a sectional view on line VIII—VIII of Fig. 7.
Figure 7:
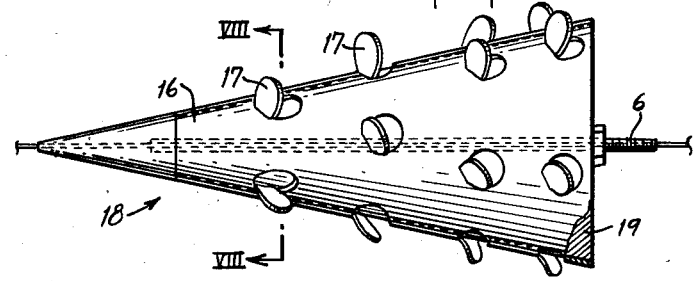
Fig. 7 is an elevational view illustrating a modified form of weed cutter constructed in accordance with the invention.

*Figs. 7 and 8*

The weed cutter shown in these figures includes a central tube 6 which may be identical with the tube 6 of Fig. 3. There is rotatably mounted on the tube 6 a cone 16, of thin sheet metal. A plurality of sharp-edged paddles 17 are formed by punching the metal of the cone 16 with slits of approximately three-quarters of a circle, and bending the tabs so formed outwardly. The paddles 17 are preferably arranged in rows, with the paddles of each row staggered longitudinally from the paddles of the adjacent rows. As the weed cutter is drawn through the water, the frictional drag of the paddles, which are tilted with respect to the direction of motion, produces a rotation of the cone 16 so that the paddles swing around and cut any plants past which they are passing. The interior of the cone 16 is preferably filled by a block 19 of cork or balsa wood to increase the buoyancy of the weed cutter.

Figure 9:
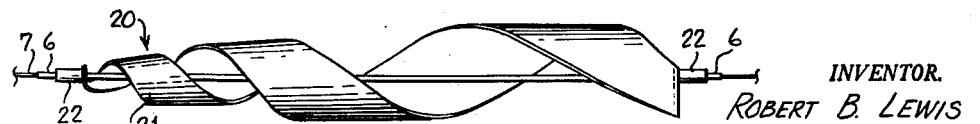
Fig. 9 is an elevational view of another form of weed cutter constructed in accordance with the invention.

*Fig. 9*

This figure illustrates another form of weed cutter generally indicated by the reference numeral 20 and comprising a tube or conduit 6 for receiving a leader 7. On the conduit 6 there is rotatably mounted a blade comprising a sharp edged ribbon 21 wound in a conical helix, and having its ends attached to cylindrical bearings 22 by which it may rotate on the tube 6. The blade 21 rotates in a similar manner to the cone 16 in Fig. 7, and thereby cuts the plants through which it is passing.

*Figs. 10 to 13*

These figures show a cutter 23 including a central tube 24 for receiving a leader 7. Fastened on the outside of the tube 24, as by welding or soldering, is a cone 25 of sheet material such as brass. The cone 25 is provided with slots 25a to receive a pair of blades 26. The blades 26 may be halves of diagonally broken common safety razor blades, and are broken or otherwise fashioned with notches 26a and 26b at their leading and trailing edges. Inside the cone 25 is a balsa wood plug 27 having recesses 27a to receive the inner edges of the blades 26. The notches 26b at the back ends of the edges fit into correspondingly shaped portions of the recesses 27a. The notches 26a at the front edges of the blades receive the front ends of the slots 25a. The balsa wood block 27 is slidable on the tube 24. At the back of the block 27 there is threadedly mounted on the tube 24 a sleeve 28 having a forward flange 28a abutting the back of the balsa wood block and another rearwardly disposed flange 28b threaded on the sleeve 28. The flange 28b may be adjusted so as to be disposed inside a pair of stops 30, which are fixed to the inside of the cone 25.

When it is desired to replace one of the blades 26, the flange 28b is rotated so that it clears the stops 30. The block 27 may then be drawn backwardly with reference to the cone 25, carrying the blades 26 back far enough so that their forward ends 26a clear the forward ends of the slots 25a, whereupon the blades may be moved and replaced. The weed cutter may then be reassembled with new blades by reversing the process just described.

*Figs. 14 and 15*

In this modification of the invention, there is mounted on a tube 31 a conical forward tip 32, which is attached to the sleeve 31 by welding or soldering. The back end of the tip is open, so as to receive projections 34a at the front ends of blades 34. The back end of blade 34 has a projection or hook 34b, which is received in a sleeve 35 which slides on the outside of the tube 31. The sleeve 35 is held in place by means of a washer 36 and a nut 37 which threadedly engages the outside of the tube 31. The sleeve 35 is provided with a forwardly projecting flange having a notch 35b for receiving and guiding the blade 34.

To replace the blade 34, the nut 35 is backed up, whereupon the sleeve 35 may be moved backward, and the hook 34b on the back end of the blade can move outwardly through the slot 35b, so that the blade may be removed and replaced.

*Figs. 16 and 17*

These figures illustrate a weed cutter 38 comprising a sheet metal cone 39 slotted at its sides and a pair of semi-conical blocks 40 of insulating material such as rubber, which are received inside the cone and which clamp between them blades 41 (only one of which is shown in the drawing) which extend outside of the cutter. The back end of the cone 39 and the blocks 40 are clamped by means of a ring 40a, so that the blades are held fixed in place. The assembly is mounted on a tube 42, being attached to the tube by a soldered connection at the front and by a nut 43 at the rear.

*Figs. 18 and 19*

These figures illustrate a weed cutter 44 comprising a generally conical shell 45 attached at its front end, as by welding or soldering, to a tube 6 for receiving a leader 7. The shell 45 is provided with lateral slots 45a for the passage of blades 46, having notches 46a and 46b at their front and rear ends. A coil spring 47 encircles the tube 6 inside the front end of the shell 45 and biases the blades 46 backwardly, holding their notches 46b in engagement with the back ends of the slots 45a.

In order to remove and replace a blade, it is simply shifted forwardly against the spring 47 until its back end clears the back of the slot, whereupon the blade may be removed and replaced.

At the back end of the shell 45, a nut 48 threadedly engages a sleeve soldered on the outside of the tube 6.

*Fig. 20*

This figure illustrates a modified form of the invention comprising a weed cutter 50 mounted on a tube 51 for receiving a leader 7. A hollow metal tip 52 of generally conical form encircles and is secured to the tube 51.

A shell 53, which may be a balsa wood block, encircles the tube 51, and has a pair of lateral slots for receiving a pair of blades 54. The blades 54 have notches 54a at their forward ends by which they hook into engagement with the back end of the cone 52. At their back ends the blades 54 have notches 54b adapted to be engaged by a coil spring 55 which encircles the tube 51 inside the shell 53. A washer 56 and a nut 57 hold the spring 55 in place, the nut 57 being threaded on a sleeve secured to the tube 6.

A blade 54 may be removed and replaced in the cutter of Fig. 20 by simply pushing the blade backwardly against the spring 55 until the hook 58 at the front end of the blade clears the tip 52, whereupon the blade may be removed. The structure shown in Fig. 20 has an advantage over the other modifications of the invention, in that if the blade is engaged by a hard unyielding obstacle such as a rock or stump, the blade is pushed backwardly against the spring 55 and as soon as the hook 58 clears the tip 52, the blade is carried away. Consequently, there will be no excessive stress placed on the line or on the leader 7 because of engagement of the blade 54 with an external object. The blade may be readily replaced the next time the line is drawn in. The blade is considerably less expensive that the equipment which might be lost if the line should break.

Instead of using a spring at one end only of the blades, as shown in Figs. 18 and 20, it may in some cases be desirable to use springs at both ends of the blades.

Figure 21:
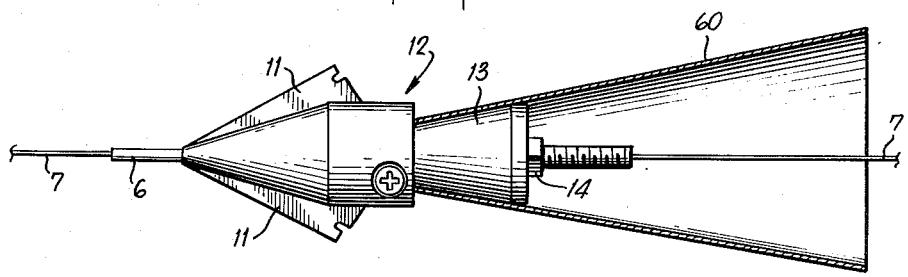
Fig. 21 is a view similar to Fig. 4, showing a piece of auxiliary equipment.

*Fig. 21*

This figure illustrates an accessory usable with the modification shown in Figs. 3, 4 and 5. This accessory comprises a conical sheet metal shield 60. The taper of the conical shield is the same as that of the plug 13, so that the shield engages it closely. The widest diameter of the shield 60 is greater than the widest lateral dimension across the blades 11.

The shield 60 is intended for use under very severe conditions, and ensures that the weeds or plants cut by the blades 11 are thrust aside far enough to clear the following lure.

Figure 22:
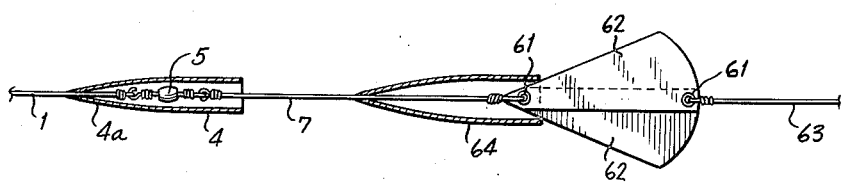
Fig. 22 is a view, partly in plan and partly in section, of still another embodiment of the invention.

*Fig. 22*

This figure illustrates a modification of the invention, in which the structure is considerably simplified as compared to the preceding embodiments. In Fig. 22, the cutter blade means comprises a pair of triangular blades 62 attached together at their front and rear ends by means of eyelets 61. A single blade structure with corresponding eyelets 61 may be used as an alternative. The front eyelet 61 serves as an aperture for threading the back end of the leader 7 for attachment of the blades 62 to the line 1. The back eyelet 61 similarly serves as a means for attaching another leader 63 extending to the lure (not shown). The leader 7 is connected to the line 1 by a swivel 5 provided with a guard 4 similar to that shown and described in Fig. 2. Another guard 64, similar to the guard 4, encircles the leader 7 just ahead of the blade means 62. The guard 64 prevents entanglement of the passing weeds with the front point of the blades 62, the eyelet 61 and with the knot in the leader 7.

The structure shown in Fig. 22 is suitable for use under some conditions, but is less stable than the modifications previously described wherein the cutter blade means are mounted on a body structure of substantial dimensions. It does not work as well under rough water and in severe weed conditions as the more elaborate modifications previously described.

In all the modifications illustrated, the solid parts may be made of buoyant material. Balsa wood is suitable for many of the parts where the stress is small. Other parts may be made of other woods, or from vinyl resin plastic material, which have been found to be suitable for such purposes.

Unless a more limited meaning is apparent from the context, the term "line" as employed in this specification and claims is intended to refer generically both to the line proper and to that extension of the line commonly used adjacent the lure and known in the art as a leader.

While I have shown and described several presently preferred embodiments of my invention, other modifications thereof will readily occur to those skilled in the art, and I therefore intend my invention to be limited only by the appended claims.

I claim:

1. Apparatus for attachment to a fishing line to protect equipment thereon from entanglement with marine plants, comprising a conduit for receiving a portion of said line, blade support means attached to the outside of said conduit, said blade support means including, for each blade, a retainer adapted to engage one end thereof, and spring means engaging the other end of the blade and biasing it into engagement with said retainer.

2. Apparatus as defined in claim 1, in which said spring means engages the front end of the blade and biases it rearwardly.

3. Apparatus as defined in claim 1, in which said spring means engages the rear end of said blade and biases it forwardly, said spring means being effective when said blade engages an unyielding object to allow movement of said blade rearwardly to disengage said retainer and release the blade.

4. Apparatus for attachment to a fishing line to protect the equipment thereon from entanglement with marine plants, comprising cutter blade means, means for attaching said cutter blade means to the line, and means effective when said blade means engages an unyielding object to release the blade means from said attaching means.

5. Apparatus for attachment to a fishing line to protect equipment thereon from entanglement with marine plants, comprising a pair of thin, flat blades, a conduit for receiving a portion of said line, and means on said conduit for supporting said blades extending outwardly with respect to and along said conduit, said blades having notches adjacent their ends forwardly disposed in the direction of movement of the line and said supporting means including hook means for engaging said notches and holding said ends of said blades fixed in position and means disposed adjacent the trailing end of said conduit and engaging said blades for moving said blades into engagement with said hook means.

6. Apparatus as defined in claim 5 including clamp means engaging said blades for holding said hook means in said notches.

7. Apparatus for attachment to a fishing line and adapted to cut marine plants through which the line is dragged, comprising a conduit for receiving a portion of said line and engaging said line so as to maintain said conduit substantially in alignment with said line, and cutter blade means mounted on said conduit and projecting outwardly and laterally therefrom and having its leading edge sharpened as a cutting blade, said cutter blade means having a form substantially preventing rotation of said blade about said line as said conduit and said line move through the water.

8. Apparatus for attachment to a fishing line and adapted to cut marine plants through which the line is dragged, comprising cutter blade means, means supporting said cutter blade means, means adapted to attach the front end of said supporting means to a fishing line and the back end of said supporting means to a fishing lure, said cutter blade means being disposed substantially in alignment with said line and projecting outwardly and laterally from said supporting means and having its leading edge sharpened as a cutting blade.

9. Apparatus as defined in claim 8, in which the fishing line attaching means comprises a leader, a connector on said leader for attachment to said line, and a guard for said connector comprising a hollow generally conical tube having an aperture at its apex for receiving said fishing line.

10. Apparatus for attachment to a fishing line and adapted to cut marine plants through which the line is dragged, comprising a pair of thin flat blades, each having a sharp edge, a conduit for receiving a portion of said line and engaging said line so as to maintain said conduit substantially in alignment with said line, and means on said conduit for supporting said blades spaced about said conduit with the sharp edges thereof disposed outwardly of and extending along said conduit and facing in the direction of the fisherman's end of the line, said flat blades being disposed with respect to said conduit so as substantially to prevent rotation of said blades about said line as said conduit and blades move through the water.

11. Apparatus for attachment to a fishing line and adapted to cut marine plants, comprising a plurality of cutter blades having sharp cutting edges, means supporting said blades in an array with said cutting edges symmetrically disposed with respect to a central axis, each said blade tapering along said axis from a relatively narrow leading end where said cutting edges are close to the axis to a relatively wide trailing end where said cutting edges are spaced outwardly from the axis, means on said supporting means adapted to connect the end thereof nearest the leading end of said cutter blade means to a fishing line, and means on said supporting means and adapted to connect the trailing end thereof to a lure, said blades being disposed substantially in alignment with said central axis and said line.

12. Apparatus as defined in claim 11, comprising a conical shield attached to said blade supporting means adjacent the wide end of said blades and extending therefrom outwardly and toward said lure, said shield having a maximum diameter greater than the maximum lateral dimension of said blade means.

13. A device for attachent to a fishing line in advance of a lure in the direction of movement thereof and adapted to cut marine plants through which the line and lure are drawn, comprising a supporting body providing a conduit elongated relative to its diameter for receiving therein a portion of said line extending lengthwise of said conduit, said conduit engaging the line received in said conduit so as to maintain said conduit substantially in alignment with said line with an end thereof disposed forwardly in the direction of movement of said device and with the other end thereof trailing, and a cutter blade mounted on and projecting laterally outwardly of said body, said blade having an outer cutting edge extending in inclined relation to and along said conduit and disposed on said blade as a leading edge, said blade having a form substantially preventing rotation of said blade about said line as the device is drawn through the water.

14. A device for attachment to a fishing line as defined in claim 13 in which the diameter of said conduit substantially throughout its length between said forward and trailing ends is restricted to maintain said line extending lengthwise of the conduit.

15. A device for attachment to a fishing line as defined in claim 13 in which said conduit is rectilinear and said blade is planar and disposed in the plane of the length of said conduit.

References Cited in the file of this patent

UNITED STATES PATENTS

| | | |
|---|---|---|
| 861,116 | Heddon | July 23, 1907 |
| 1,178,861 | Kruschke | Apr. 11, 1916 |
| 1,250,676 | Segerc | Dec. 18, 1917 |
| 1,333,318 | Kijima | Mar. 9, 1920 |
| 1,389,644 | Gottschalk | Sept. 6, 1921 |
| 1,610,204 | Donholt | Dec. 7, 1926 |
| 1,768,033 | Deatz | June 24, 1930 |
| 2,140,724 | Stefan | Dec. 20, 1938 |
| 2,214,217 | Adams | Sept. 10, 1940 |
| 2,241,367 | Sarff | May 6, 1941 |
| 2,465,127 | Stark | Mar. 22, 1949 |
| 2,473,644 | Groza | June 21, 1949 |
| 2,537,321 | Walton | Jan. 9, 1951 |
| 2,630,850 | Elsaesser | Mar. 10, 1953 |
| 2,672,704 | Smith | Mar. 23, 1954 |

FOREIGN PATENTS

| | | |
|---|---|---|
| 411,770 | Germany | Mar. 31, 1925 |

UNITED STATES PATENT OFFICE
CERTIFICATE OF CORRECTION

Patent No. 2,926,452                                      March 1, 1960

Robert B. Lewis

It is hereby certified that error appears in the printed specification of the above numbered patent requiring correction and that the said Letters Patent should read as corrected below.

Column 2, line 14, for "exaggered" read -- exaggerated --; column 5, line 25, for "that" read -- than --; column 6, line 45 after "position" insert a comma.

Signed and sealed this 23rd day of August 1960.

(SEAL)
Attest:
KARL H. AXLINE
Attesting Officer

ROBERT C. WATSON
Commissioner of Patents